United States Patent [19]
Wolf et al.

[11] Patent Number: 5,218,066
[45] Date of Patent: Jun. 8, 1993

[54] HYDRAZONE INITIATED POLYMERIZATION PROCESS

[75] Inventors: Richard A. Wolf; John M. Warakomski, both of Midland, Mich.

[73] Assignee: The Dow Chemical Company, Midland, Mich.

[21] Appl. No.: 268,137

[22] Filed: Nov. 7, 1988

[51] Int. Cl.$^5$ ............................................. C08F 4/04
[52] U.S. Cl. .................................. 526/218.1; 526/217; 564/251
[58] Field of Search ............................ 526/218.1, 217; 564/251

[56] References Cited

U.S. PATENT DOCUMENTS 2,478,066  8/1949  van Peski ........................ 526/217
2,601,293  4/1950  Howard .......................... 526/217

FOREIGN PATENT DOCUMENTS 50-049383  5/1975  Japan ........................... 526/218.1

*Primary Examiner*—Joseph L. Schofer
*Assistant Examiner*—Alex H. Walker

[57] ABSTRACT

The invention is an improved process for polymerization of vinyl monomers under polymerization conditions with hydrazone initiators at a temperature range of from −10° C. to about 98° C. in the substantial absence of a peroxide to prepare an addition polymer thereof. The process is especially useful for preparation of polymers of acrylic acid, $C_{1-4}$ esters of acrylic acid and acrylamide.

7 Claims, No Drawings

HYDRAZONE INITIATED POLYMERIZATION PROCESS

FIELD OF THE INVENTION

The invention relates to an improved process for polymerization of vinyl monomers utilizing hydrazone initiators.

BACKGROUND

Polymerization of vinyl monomers to prepare polyvinyl resins has been extensively researched and practiced. Economic competition in the thermoplastics manufacturing industry has created a marketplace in which the consumer enjoys a plethora of plastic products; however, there exists an ever increasing demand for lower priced, quality products. This widespread commercial success of thermoplastic products prepared from polyvinyl resins has generated incentive to search for more efficient methods of preparation.

In order to improve commercial preparation of thermoplastic products, efforts have been made to improve the polymerization processes which provide the feedstock polyvinyl resin. Various initiators and catalysts for polymerization processes have been taught.

Van Peski, U.S. Pat. No. 2,478,066 discloses hydrazone as a polymerization promoter for vinyl monomers, the reaction taking place at high temperature under pressurized conditions.

Conventional polymerization processes require relatively high temperatures to first initiate polymerization and then to provide for high rates of conversion of the monomeric unsaturate to the polymeric resin. Elevated temperatures degrade the resin thus adversely effecting the structural properties of the thermoplastic product.

In order to polymerize vinyl monomers at lower temperatures, azo and peroxide initiators have been taught. Howard, U.S. Pat. No. 2,610,293 discloses the use of both a hydrazone and a peroxide initiator in the polymerization of vinyl monomers. A disadvantage to the commercial use of volatile chemicals such as peroxides is that they are hazardous to use and production costs increase accordingly.

It would be highly desirable to be able to polymerize vinyl monomers under milder, safer and less costly polymerization conditions.

SUMMARY OF THE INVENTION

The present invention offers a more efficient and safer process for polymerization of vinyl monomers using non-volatile hydrazone initiators.

One aspect of the invention is a process for polymerization of vinyl monomers comprising contacting a monomer of Formula II with a hydrazone corresponding to Formula I:

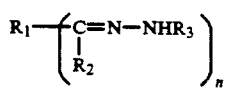    I

    II wherein:
$R_1$ is selected from the group consisting of hydrogen and n functional aromatic or aliphatic groups having up to 25 carbons;
$R_2$ is H or $C_{1-22}$ alkyl;
$R_3$ is H, an aryl or an alkyl group of up to 22 carbons;
$R_4$ is selected from the group consisting of —$COOR_5$, —$CON(R_5)_2$, cyano, phenyl and substituted phenyl wherein a substituent is selected from the group consisting of halo, hydroxy, nitro, thio and $C_{1-22}$ alkyl;
$R_5$, $R_6$ and $R_7$ are independently hydrogen or a $C_{1-22}$ alkyl; and
n=an integer from 1 to 10;
at a temperature from 0° C. to 98° C. in the substantial absence of a peroxide to prepare an addition polymer thereof.

Another aspect of the invention is a multiple step process for polymerization of vinyl monomers wherein in a first step, a suitable hydrazone insensitive vinyl monomer is caused to polymerize in the presence of a hydrazone so as to prepare a hydrazone-containing vinyl polymer; and in a subsequent step the hydrazone-containing vinyl polymer is contacted with a hydrazone sensitive vinyl monomer so as initiate polymerization of the vinyl monomer.

A further aspect of the invention is a multiple step process of polymerization of vinyl monomers comprising the sequential steps of:
(a) contacting vinyl monomers which are at least partially ketone substituted under polymerization conditions to prepare a polymer having pendant ketone groups;
(b) reacting the polymer having pendant ketone groups with a hydrazine to prepare a polymer having pendant hydrazone groups; and
(c) contacting the polymer having pendant hydrazone groups with a hydrazone sensitive monomer under polymerization conditions so as to cause the polymerization of the hydrazone sensitive monomer.

DETAILED DESCRIPTION

A preferred hydrazone of formula 1 contains an $R_1$ group comprising a substituted aromatic or a substituted aliphatic group wherein a substituent is selected from the group consisting of cyano, amino, hydroxy, phenoxy, nitro and combinations thereof.

A more preferred hydrazone is selected from the group consisting of acetophenone t-butylhydrazone (ATBH), benzene 1,3,5-tris(acetyl t-butylhydrazone) (BTABH), 1-phenylpropanone t-butylhydrazone, 4-phenyl-2-butanone t-butylhydrazone, 2,5-hexanedione bis(t-butylhydrazone), 2,4-pentanedione bis(t-butylhydrazone), acetophenone phenylhydrazone, benzaldehyde t-butylhydrazone, cyclohexanone t-butylhydrazone and methylbenzoylformate t-butylhydrazone. Most preferred hydrazones are acetophenone t-butylhydrazone and benzene 1,3,5-tris(acetyl-t-butylhydrazone).

The hydrazones are prepared in a one-step process of combining commercially available ketones or aldehydes with tert-butylhydrazine, phenylhydrazine, phenylhydrazine hydrochloride or tert-butylhydrazine hydrochloride. Further purification, if necessary, can be done by crystallization or fractional distillation.

A preferred vinyl monomer is a compound of Formula II:

    II wherein:

$R_4$ is selected from a group consisting of —COOR$_5$ and —CON(R$_5$)$_2$; and $R_5$, $R_6$ and $R_7$ are independently hydrogens or a $C_{1-22}$ alkyl.

More preferably, the vinyl monomer is selected from the group consisting of acrylic acid, $C_{1-4}$ esters of acrylic acid and acrylamide.

The polymerization may occur at temperatures ranging from subambient up to temperatures above the boiling points of the monomer, solvent, suspending agent, or emulsifying agent, in which case the polymerization is conducted under pressure higher than ambient pressure. Process conditions include temperature ranges from about −10° C. (degrees centigrade) to about 98° C., preferably from about 0° C. to about 90° C., more preferably from about 15° C. to about 50° C.

The polymerization may occur at pressure ranges from subatmospheric to about 5000 pounds per square inch gauge (psig) (34,475 kiloPascals gauge (kPag)), preferably from about 1.5 psig (10 kPag) to about 1000 psig (6875 kPag), more preferably from about 3 psig (20 kPag) to about 150 psig (1000 kPag), and most preferably from about 15 psig (104 kPag) to about 30 psig (207 kPag).

The polymerization may occur in the presence or absence of dissolved oxygen, although removal of oxygen is preferred. The polymerization may occur in the presence of standard free radical inhibitors, such as phenols, transition metals, quinones, nitroaromatics, aryl amines and sulphur, depending on the molar ratio of hydrazone to inhibitor. Preferably the ratio of hydrazone to such inhibitors is greater than one.

The hydrazone initiator is preferably present at about 0.01 to about 50 mole percent relative to the vinyl monomer, preferably from about 0.01 to about 5 mole percent and more preferably from about 0.1 and about 2 mole percent. The polymerization may be conducted in mass, solution, emulsion, suspension or any combination thereof.

Hydrazone initiators are highly selective with respect to the structure of the monomers with which they will readily react under conditions of an ambient temperature range and a substantial absence of a peroxide For example, acrylic acid will undergo polymerization at ambient temperature while styrene is unreactive until the temperature is raised above about 90° C.

Therefore, due to the differential reactivity and selectivity of hydrazones with regard to the polymerization of vinyl monomers, multiple step polymerization processes may be designed to prepare polymers in the form of interconnecting networks or graft copolymers.

In a first step, a suitable hydrazone insensitive vinyl monomer is caused to polymerize in the presence of a hydrazone so as to prepare a hydrazone-containing vinyl polymer. In a subsequent step the hydrazone-containing vinyl polymer is contacted with a hydrazone sensitive vinyl monomer so as to initiate polymerization of the vinyl monomer.

There are at least two ways of obtaining a hydrazone-containing vinyl polymer. In a first embodiment, the hydrazone-containing polymer may comprise a polymer which forms a convoluted structure during polymerization such that any hydrazone within the reaction vicinity becomes trapped within the polymerized polymer. In a second embodiment, the hydrazone-containing polymer may comprise a polymer with pendant hydrazone groups. Such polymers may be formed if a polymerizable functionality is present in the hydrazone compound.

An example of the first type of hydrazone-containing polymer is a hydrazone-containing latex particle which is prepared and used in a multiple step polymerization as follows. A latex particle is formed by polymerization of a hydrazone insensitive monomer in the presence of hydrazone. The so formed latex particle consequently contains quantities of the non-reacted hydrazone initiator trapped inside the latex particle. In a subsequent step, this hydrazone-containing polymer can be contacted with a vinyl monomer, for example, methyl acrylate, under polymerization conditions in which the monomer is sensitive to hydrazone initiation. As the vinyl monomer is imbibed into the hydrazone-containing latex particle, the trapped hydrazone initiates polymerization of the vinyl monomers within the particle. A resulting polymer product may be in the form of an interpenetrating network or even a graft copolymer. The resulting product may exhibit beneficial properties compared to an unmodified particle, such as altered structural strength, altered solubility or an altered degree of tackiness.

An example of the second type of hydrazone-containing polymer used in a multiple step process is as follows. A vinyl-monomer is contacted with a ketone-substituted vinyl monomer, such as methyl vinyl ketone, under polymerization conditions as to prepare a polymer having pendant ketone groups. The polymer may then be reacted with a hydrazine to obtain a polymer having pendant hydrazone groups. Subsequently, in a next step, a hydrazone sensitive monomer is contacted with the hydrazone-containing polymer under polymerization conditions so as to cause the polymerization of the hydrazone sensitive monomer.

The so formed polymers resulting from the multiple step polymerization are usefully employed as compatibilizers or emulsifiers. For example, the product formed by such sequential in situ polymerization of polymer A and polymer B, may be useful as an additive to compatibilize a mixture of polymer A and polymer B.

The following examples are illustrative of processes for polymerization of vinyl monomers, initiated by hydrazones of the present invention under conditions of an ambient temperature range and a substantial absence of a peroxide.

EXAMPLE 1

Polymerization of Styrene Monomer Using Acetophenone t-Butylhydrazone (ATBH)

Styrene (2.69 g) (neat) and 0.06 grams (g) ATBH (1.20 mole percent ATBH, based on styrene) were combined in a test tube. The reaction solution was sparged with nitrogen for two minutes at ambient temperature. The test tube, with nitrogen sparging, was heated at 90° C. for 75 minutes, as the viscosity of the reaction solution slowly increased. Part of the reaction solution (2.13 g) was dissolved into 5 milliliters (ml) toluene and then poured into 150 ml methanol. The white solid was collected by centrifugation and dried at 100° C. for one hour in a vacuum oven. The yield of solids was 0.25 g, corresponding to 12 percent conversion to polystyrene.

EXAMPLE 2

Preparation of Poly(methyl acrylate) Using Acetophenone t-Butylhydrazone as Initiator Methyl acrylate monomer (neat) (10 g) was put into a vial and the liquid was sparged for 10 minutes with argon at ambient temperature. Acetophenone t-butylhydrazone (ATBH) (0.1 g) (0.452 mole percent, based on methyl acrylate) was added, and the argon sparge was continued. After 10 minutes, at ambient temperature, the liquid thickened noticeably. The liquid formed a hard solid polymer in an exothermic polymerization within two minutes. The solid polymer was dissolved into 100 ml of toluene. A white solid formed when the toluene solution was poured into 500 ml of methanol. The solid was collected by suction filtration, washed with additional methanol, and dried in a vacuum oven at about 40° C. to about 45° C. for 3.5 hours. Yield of dry polymer was 7.74 g (77.4 percent conversion of methyl acrylate to polymer). The molecular weight of the polymer was determined in toluene solution using rheology techniques to be 753,000.

EXAMPLE 3

Polymerization of Acrylic Acid Using Acetophenone t-Butylhydrazone as Initiator Into a vial was added 0.019 g ATBH and 0.95 ml of neat acrylic acid, containing 0.75 weight percent of trimethylolpropane triacrylate (TMPTA), a crosslinking agent. The mole percent of ATBH to acrylic acid was 0.75 percent. Immediately upon contact of acrylic acid with ATBH, an exotherm occurred, with essentially complete formation of solid polymer.

EXAMPLE 4

Larger Scale Polymerization of Aqueous Acrylic Acid, Using ATBH

An aqueous solution of 27.44 g of acrylic acid with 0.75 weight percent TMPTA and 82.3 g water was prepared and sparged with nitrogen for one hour with stirring. To the solution, at ambient temperature, was added a solution of 0.56 g of ATBH in 3 ml acetone (0.77 mole percent ATBH, based on acrylic acid).

Within 20 seconds after addition of the ATBH, a colorless gel formed, and the reaction flask became warm. The reaction flask was allowed to stand at ambient temperature overnight. A portion (4.57 g) of the wet product gel was shaken with 500 g of 0.9 percent aqueous sodium chloride for four hours. The resulting slurry was doubly filtered, through 100 mesh nylon and size #3 Whatman filter paper under suction. The collected filtrate was analyzed for acrylic acid content using liquid chromatography techniques. A Whatman Partisil 10 ODS-2 chromatography column was employed, with 0.02N $H_2SO_4$ as a carrier solution. The percent acrylic acid detected in the gel was 4.85 percent; therefore, the conversion of acrylic acid to polymer was 95.1 percent. The wet product gel (64.68 g) was ground in a blender and neutralized with 55 50 g of 15 percent by weight of aqueous sodium carbonate and then mixed by kneading. The resulting mixture was dried in a vacuum oven at 100° C. for 22 hours. The solids were ground in a blender and sieved through a 20–100 mesh filter. The free swell capacity of the polymer powder in 0.9 percent aqueous sodium chloride was measured to be 45.3 g solution/g polymer.

EXAMPLE 5

Larger Scale Polymerization of Aqueous Acrylic Acid Using Benzene 1,3,5-Tris (Acetyl t-Butylhydrazone) (BTABH)

The method of Example 4 was repeated, except that 25.18 g of acrylic acid (with 0.75 weight percent TMPTA) and 0.49 g BTABH (0.35 mole percent BTABH, based on acrylic acid) were used. In 30 seconds after addition of the BTABH/acetone solution (13.9 weight percent), a yellow gel formed. The reaction flask was allowed to stand at ambient temperature overnight. The gel product was prepared to measure percent conversion and free swell capacity in the same manner as described in Example 4. The percent conversion of acrylic acid to polymer was 96.8 percent. The free swell capacity was 43.1 g solution/g polymer.

EXAMPLE 6

Polymerization of Acrylamide Using 1-Phenyl-2-Propanone t-Butylhydrazone

Into a vial was put 12.0 g of acrylamide. Water was added to make a 50 percent by weight aqueous solution. The solution was sparged with argon for 16 minutes. Then, 1-Phenyl-2-propanone t-butylhydrazone (60 mg, 0.35 mole percent hydrazone, based on acrylamide) was added. With continued argon sparging, the reaction solution was heated from about 25° C. to about 42° C. over an 18 minute time interval with no apparent polymerization. A sudden polymerization occurred during the next minute at 47° C. A tough gel-type polymer was formed.

EXAMPLE 7

Polymerization of Acrylamide Using 2,5-Hexanedione Bis(t-Butylhydrazone)

Into a vial was put 12.0 g of acrylamide and water was added to make a 50 percent by weight aqueous solution. The solution was sparged with argon for 12 minutes. Then, 2,5-hexanedione bis(t-butylhydrazone) (60 mg, 0.56 mole equivalent percent hydrazone, based on acrylamide) was added. With continued argon sparging, the reaction solution was heated from 23° C. to 52° C. over a 26 minute time interval, with no apparent polymerization. A sudden polymerization occurred between 26 and 27 minutes at 52° C. to 54° C. A soft gel-type polymer quickly formed during this one minute time interval.

EXAMPLE 8

Polymerization of Acrylamide Using Cyclohexanone t-Butylhydrazone

Into a vial was put 12.0 g of acrylamide and water was added to make a 50 percent by weight aqueous solution. The solution was sparged with argon for 11 minutes. Then, cyclohexanone t-butylhydrazone (66 mg, 0.46 mole percent hydrazone, based on acrylamide) was added. With continued argon sparging, the reaction solution was heated from 23° to 52° C. over a 22 minute time interval, with no apparent polymerization. A sudden polymerization occurred between 22 minutes and 23 minutes, at 52° C. to 55° C. A soft gel-type polymer formed quickly during a one minute time interval.

RESULTS

From the results of these examples, it can be concluded that there exists a wide variance in rate of initiation of polymerization of vinyl monomers using the above-listed hydrazones. The most reactive monomers appear to be acrylates, for example, acrylamide, acrylic acid, and methyl acrylate. The most reactive hydrazones are the t-butylhydrazones of the aryl and methyl ketones, especially acetophenone t-butylhydrazone (ATBH) and benzene 1,3,5-tris(acetyl t-butylhydrazone) (BTABH). When the most reactive hydrazones are used to initiate the polymerization of the most reactive vinyl monomers, a rapid rate, exothermic initiation of polymerization occurs.

When one reactive vinyl monomer is held constant, the relative rates of initiation of acrylamide polymerization by hydrazones is in the order: acetophenone t-butylhydrazone>>benzene 1,3,5-tris(acetyl t-butylhydrazone)≦ methylbenzylformate t-butylhydrazone>2,4-pentanedione bis(t-butylhydrazone)>>2,5 hexanedione bis(t-butylhydrazone).

When the most reactive hydrazone, ATBH, is held constant, the relative rates of initiation of vinyl monomers is in the order: acrylamide>acrylic acid>methyl acrylate>methyl methacrylate>styrene>>vinyl acetate≈maleic acid.

The molecular weights of the exemplary products as measured by inherent viscosity methods were relatively high. The weight average molecular weight (MW) values for the isolated polymethacrylate, (753,000), and polymethylmethacrylate, (556,000), suggest that these high yield polymerization processes are adequate for commercial use.

What is claimed is:

1. A process for polymerization of vinyl monomers comprising contacting a monomer of Formula II with a hydrazone corresponding to Formula I: wherein R₁ is an n functional aromatic

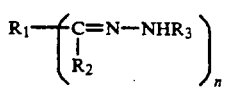
I

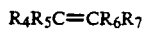
II group or substituted aromatic group having up to 25 carbons;

R$_2$ is C$_{1-22}$ alkyl;

R$_3$ is a tertiary alkyl group of up to 22 carbons;

R$_4$ is selected from the group consisting of —COOR$_5$, —CON(R$_5$)$_2$, cyano, phenyl and substituted phenyl wherein a substituent is selected from the group consisting of halo, hydroxy, nitro, thio and C$_{1-22}$ alkyl;

R$_5$, R$_6$ and R$_7$ are independently hydrogen or a C$_{1-22}$ alkyl; and n is an integer from 1 to 10;

at a temperature from −10° C. to 98° C. in the substantial absence of a peroxide to prepare an addition polymer thereof.

2. The process of claim 1 wherein R$_1$ is a substituted aromatic group wherein the substituent is selected from the group consisting of cyano, amino, hydroxy, phenoxy, nitro and combinations thereof.

3. The process of claim 1 wherein the hydrazone is selected from the group consisting of acetophenone t-butylhydrazone, benzene 1,3,5-tris(acetyl-t-butylhydrazone, 1-phenylpropanone t-butylhydrazone, 4-phenyl-2-butanone t-butylhydrazone, and methylbenzoylformate t-butylhydrazone.

4. The process of claim 1 wherein the vinyl monomer is a compound of Formula II:

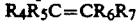
II wherein:

R$_4$ is selected from the group consisting of —COOR$_5$ and —CON(R$_5$)$_2$; and R$_5$, R$_6$, and R$_7$ are independently H or C$_{1-22}$ alkyl.

5. The process of claim 1 wherein the vinyl monomer is selected from the group consisting of acrylic acid, C$_{1-4}$ esters of acrylic acid and acrylamide.

6. The process of claim 1 wherein the temperature range comprises temperatures from about 0° C. to about 90° C.

7. The process of claim 1 wherein the temperature range comprises temperatures from a out 15° C. to about 50° C.

* * * * *